United States Patent
Hasegawa et al.

(10) Patent No.: US 7,160,926 B2
(45) Date of Patent: Jan. 9, 2007

(54) ION EXCHANGE FLUOROCARBON RESIN MEMBRANE

(75) Inventors: Takuya Hasegawa, Yokohama (JP); Yuichi Inoue, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 292 days.

(21) Appl. No.: 10/479,036

(22) PCT Filed: May 31, 2002

(86) PCT No.: PCT/JP02/05383

§ 371 (c)(1), (2), (4) Date: Nov. 26, 2003

(87) PCT Pub. No.: WO02/096983

PCT Pub. Date: Dec. 5, 2002

(65) Prior Publication Data

US 2004/0242708 A1    Dec. 2, 2004

(30) Foreign Application Priority Data

May 31, 2001   (JP)   ............ 2001-164781

(51) Int. Cl.
  *C08J 5/20*   (2006.01)
(52) U.S. Cl. .................... 521/27; 521/28; 526/245; 526/250; 526/255
(58) Field of Classification Search .......... 526/245, 526/250, 255; 521/27, 28

See application file for complete search history.

(56) References Cited

U.S. PATENT DOCUMENTS 4,246,091 A   1/1981   Murayama et al.

FOREIGN PATENT DOCUMENTS

| EP | 1 091 435 A1 | 4/2001 |
|---|---|---|
| JP | 57-182345 A | 11/1982 |
| JP | 60-149631 A | 8/1985 |
| JP | 6-111827 A | 4/1994 |
| JP | 7-508779 A | 9/1995 |
| JP | 11-329062 A | 11/1999 |
| JP | 11-349710 A | 12/1999 |
| WO | WO-86/06879 A1 | 11/1986 |
| WO | 1 091 435 A1 * | 4/2001 |

OTHER PUBLICATIONS

Kevin M. et al.: Polymer Preprints, vol. 36, No. 2 Aug. 1995, pp. 374-375, ISSN 0032-3934.
Kazuo Okuyama et al.: Journal of the Chemical Society of Japan, No. 12, 1994, pp. 1087-1090, ISSN 0369-4577.
Yuka Miura, et al.: Thermochimica Acta, vol. 163, 1990, pp. 161-168, ISSN 0040-6031.
Thein Kyu et al.: Canadian Journal of Chemistry, vol. 61, No. 4., 1983, pp. 680-687, ISSN 0008-4042.
K.T. Adjemian et al.: Fuel Cell Seminar, 2000, pp. 164-166.

* cited by examiner

*Primary Examiner*—Robert D. Harlan
(74) *Attorney, Agent, or Firm*—Birch, Stewart, Kolasch & Birch, LLP (57) ABSTRACT

An ion exchange fluorocarbon resin membrane having a storage modulus (JIS K-7244), when substituted with tributyl ammonium ions, at a temperature of not less than Tc represented by the following general equations (1-1) to (1-3) of $0.8 \times 10^6$ Pa or more, and a heat of crystal fusion at 270 to 350° C. of 1 J/g or less:

$$Tc\ (°C.) = 55 + Tg\ (EW < 750) \quad (1\text{-}1)$$

$$Tc\ (°C.) = 0.444 \times EW - 278 + Tg\ (750 \leq EW < 930) \quad (1\text{-}2)$$

$$Tc\ (°C.) = 135 + Tg\ (EW \geq 930) \quad (1\text{-}3)$$

where Tg designates the peak temperature of loss tangent in the dynamic viscoelasticity measure-ment of the ion exchange fluorocarbon resin membrane (having $SO_3H$ as the ends of the side chains).

17 Claims, 3 Drawing Sheets

ION EXCHANGE FLUOROCARBON RESIN MEMBRANE

TECHNICAL FIELD

The present invention relates to an ion exchange fluorocarbon resin membrane used as an electrolyte and a diaphragm of a solid polymer type of fuel cell, in particular to an ion exchange fluorocarbon resin membrane having excellent performance as an electrolyte and a diaphragm.

BACKGROUND ART

A fuel cell is a sort of electric generator that generates electric energy by electrochemically oxidizing fuels such as hydrogen and methanol, and has lately attracted attention as a clean energy source. Fuel cells are classified into a phosphoric acid type, a molten carbonate type, a solid oxide type, a solid polyelectrolyte type or the like according to the kind of the electrolyte to be used. Among these the solid polyelectrolyte type of fuel cell is expected to be widely applied as a power source for electric vehicles or the like because of its low standard operating temperature, as low as 100° C. or below, and its high energy density.

The solid polyelectrolyte type fuel cell is basically composed of an ion exchange membrane and a pair of gas diffusion electrodes bonded to both sides thereof. It generates electricity by supplying hydrogen to one electrode and oxygen to the other electrode while both electrodes are connected to an external load circuit. More specifically, protons and electrons are formed in the hydrogen side electrode. The protons migrate through the ion exchange membrane to the oxygen side electrode, and then react with oxygen to form water, while the electrons flow through a conductor from the hydrogen side electrode and discharge electric energy in the external load circuit. They then arrive at the oxygen side electrode through another conductor, resulting in contributing to the course of the above-described water-forming reaction. Although a required characteristic of the ion exchange membrane is high ion conductivity in the first place, high water content and high water dispersibility in addition to the ion conductivity, are also important required characteristics because protons are considered to be stabilized by hydration of a water molecules when migrating through the ion exchange membrane. In addition, since the ion exchange membrane also plays the role of a barrier to prevent direct reaction of hydrogen and oxygen, low gas permeability is required. Furthermore, properties such as chemical stability to resist a strong oxidation atmosphere during the fuel cell operation, and mechanical strength to meet the requirements for a thin membrane, are also necessary.

Ion exchange fluorocarbon resins are widely employed as a material for the ion exchange membrane used in fuel cells of the solid polyelectrolyte type, because of their high chemical stability. "Nafion" (registered trademark) manufactured by E.I. du Pont de Nemours and Company having a perfluorocarbon as the main chains and sulfonic acid groups at the end of side chains is widely used. Although such an ion exchange fluorocarbon resin has generally balanced properties as a solid polyelectrolyte material, further improvements in the properties thereof have been required with progress in the practical use of the fuel cells.

For example, although higher heat resistance has been increasingly demanded, particularly in motor vehicle applications for preventing catalyst poisoning and improving the cooling effect, it is said that the operation of the present standard ion exchange fluorocarbon resin membrane at 90° C. or above is difficult. Specifically, the above-described higher heat resistance requires improvement of the heat resistance of ion exchange fluorocarbon resin membranes to 100° C. or above, preferably 120° C. or above.

As means to improve the heat resistance of ion exchange fluorocarbon resin membranes, prior art techniques using the addition of reinforcing agents or block copolymerization, such as block copolymerization with PTFE (JP-A-11-329062), the addition of PTFE fibrils (JP-A-60-149631) or inorganic particles (JP-A-6-111827), as well as the formation of $SiO_2$ networks by the sol-gel method (K. T. Adjemianetal, 2000 Fuel Cell Seminar, pp. 164–166), are known. According to these prior art techniques, although heat resistance was improved to some extent by the addition of reinforcing agents in several percent by weight or block copolymerization, the lowering of ionic conductivity in exchange for incrased heat resistance became a problem because of the lowering of an apparent exchange capacity. On the other hand, in addition to the addition of reinforcing agents, a prior art technique wherein cross-linking functional groups are copolymerized with the precursor of an ion exchange fluorocarbon resin membrane (JP-A-7-508779) are also known. According to such a technique, although it is considered that heat resistance can be compatible with ionic conductivity by properly designing cross-linking, there is a problem that cross-linking leads to increase in costs, and in certain cases, the cross-linking reaction takes a long time. As described above, prior art techniques related to the improvement of heat resistance have essential problems, and have not become industrially useful techniques for ion exchange membranes for fuel cells.

DISCLOSURE OF THE INVENTION

An object of the present invention is to provide a exchange fluorocarbon resin membrane superior in heat resistance.

An ion exchange fluorocarbon resin membrane can be manufactured for example by melt-forming a precursor of the ion exchange fluorocarbon resin into the form of a membrane, and then hydrolyzing the membrane.

The present inventors paid attention to the storage modulus of the precursor of the ion exchange fluorocarbon resin and found after extensively repeated studies that the ion exchange fluorocarbon resin membrane having a specific storage modulus manifested non-liquidity and melt strength as a cross-linked membrane at a high temperature of the flow-starting temperature or above without treatment such as cross-linking or the modification of molecular structures, and thus accomplished the present invention.

Namely, the present invention is as follows:

(1) An ion exchange fluorocarbon resin membrane having a storage modulus (JIS K-7244), when substituted with tributyl ammonium ions, at a temperature of not less than Tc represented by the following general equations (1-1) to (1-3) of $0.8 \times 10^6$ Pa or more, and a heat of crystal fusion at 270 to 350° C. of 1 J/g or less:

$$Tc(°C.) = 55 + Tg \quad (EW < 750) \tag{1-1}$$

$$Tc(°C.) = 0.444 \times EW - 278 + Tg \quad (750 \leq EW < 930) \tag{1-2}$$

$$Tc(°C.) = 135 + Tg \quad (EW \geq 930) \tag{1-3}$$

where Tg designates the peak temperature of loss tangent in the dynamic viscoelasticity measurement of the ion exchange fluorocarbon resin membrane (having $SO_3H$ as the ends of the side chains).

(2) An ion exchange fluorocarbon resin membrane having a storage modulus (JIS K-7244) of $1.0 \times 10^6$ Pa or more at 200° C., a heat of crystal fusion at 270 to 350° C. of 1 J/g or less, an equivalent weight of 950 or less, and a Tg of 135° C. or above.

(3) An ion exchange fluorocarbon resin membrane having a storage modulus (JIS K-7244), when substituted with tributyl ammonium ions, at a temperature Tc represented by the above-described general equations (1) or above of $0.8 \times 10^6$ Pa or more, and a molecular weight of a fluorinated olefin chain in a polymer of 3,000 or less.

(4) The ion exchange fluorocarbon resin membrane according to any of (1) to (3), wherein a ratio of the storage modulus at 150° C. to the storage modulus at 200° C. is 0.4 or more.

(5) The ion exchange fluorocarbon resin membrane according to any of (1) to (4), wherein a ratio of the storage modulus at Tc−50° C. to the storage modulus at Tc is 0.4 or more.

(6) The ion exchange fluorocarbon resin membrane according to any of (1) to (5), wherein a high-temperature break strength at 220° C. is 2 kg/cm² or more.

(7) The ion exchange fluorocarbon resin membrane according to any of (1) to (6), wherein the ion exchange fluorocarbon resin membrane is not cross-linked.

(8) A method of manufacturing an ion exchange fluorocarbon resin membrane by forming a film of a precursor of the ion exchange fluorocarbon resin, and hydrolyzing the same, wherein the precursor of the ion exchange fluorocarbon resin has a heat of crystal fusion at 270 to 350° C. of 1 J/g or less, and a melt index of 1 or less.

(9) The method according to (8), wherein the precursor of the ion exchange fluorocarbon resin has a melt index (JIS K-7210) of 0.5 or less.

(10) The method according to (8), wherein the precursor of the ion exchange fluorocarbon resin has a melt index (JIS K-7210) of 0.4 or less.

(11) The method according to (8), wherein the precursor of the ion exchange fluorocarbon resin has a melt index (JIS K-7210) of 0.1 or less.

(12) The method according to any of (8) to (11), wherein stretching is performed in at least one direction after film formation.

(13) The method according to (12), wherein stretching is performed prior to hydrolysis, and the hydrolysis is performed while maintaining orientation.

(14) The method according to (12) or (13), wherein the temperature for the stretching is 70° C. or above and below 300° C.

(15) A membrane electrode composite comprising an ion exchange fluorocarbon resin membrane according to any of (1) to (7).

(16) A solid polyelectrolyte type fuel cell comprising an ion exchange fluorocarbon resin membrane according to any of (1) to (7).

BEST MODE FOR CARRYING OUT THE INVENTION

Figure 1:
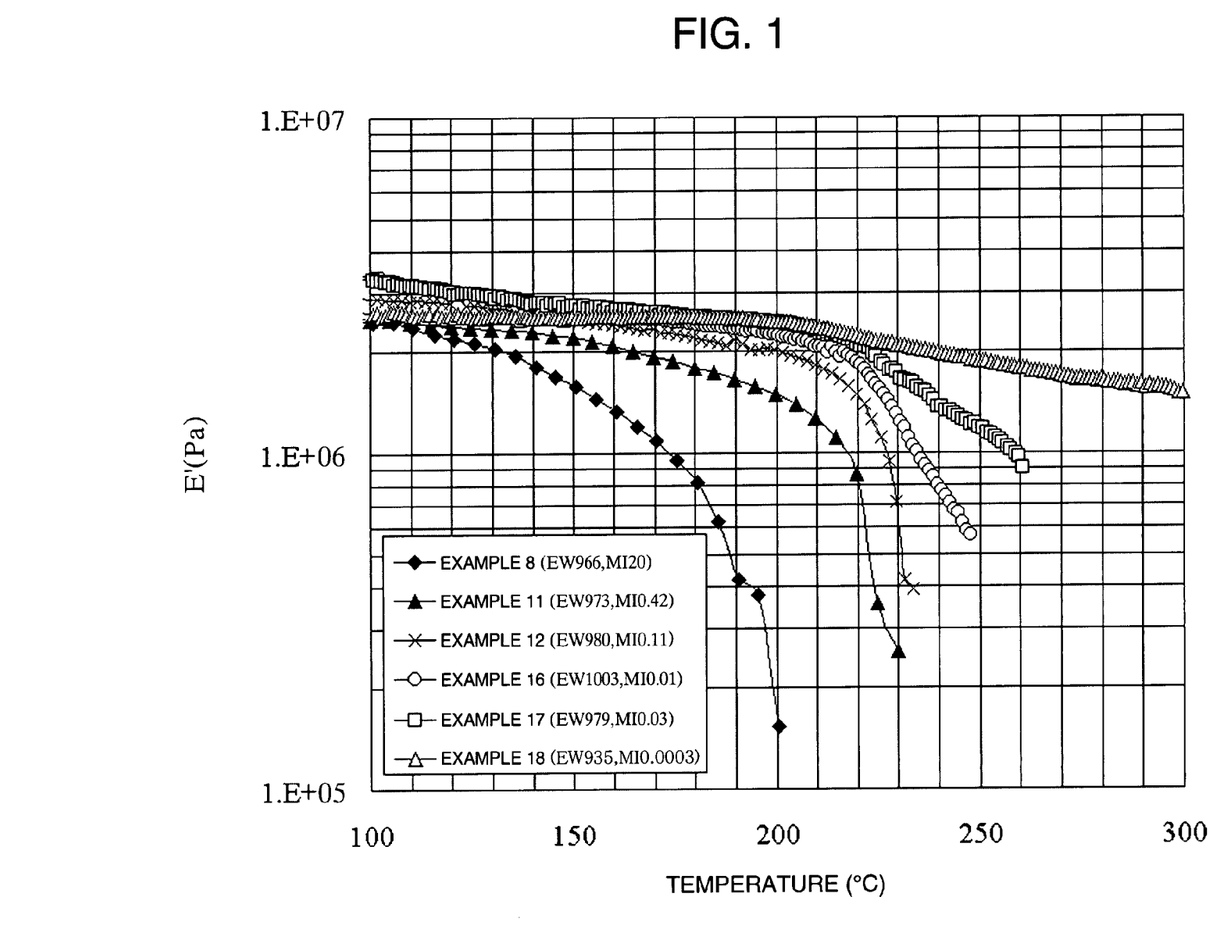
FIG. 1 is a graph showing the relationship between the temperatures and storage moduli on the film having $SO_2F$ as the ends of the side chains in Examples 8, 11, 12, and 16 to 18.
Figure 2:
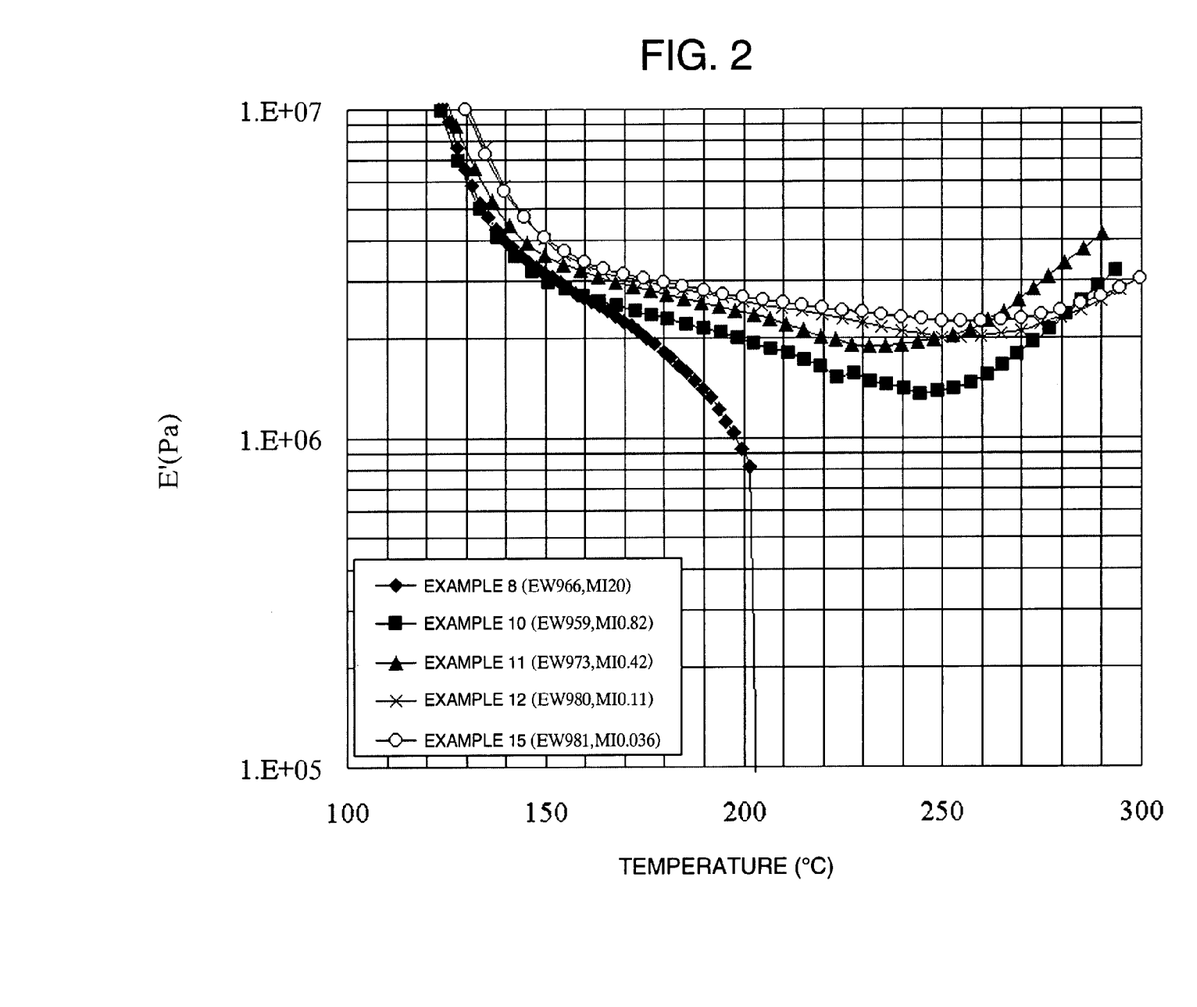
FIG. 2 is a graph showing the relationship between the temperatures and storage moduli on the film having $SO_3H$ as the ends of the side chains in Examples 8, 10 to 12, and 15.
Figure 3:
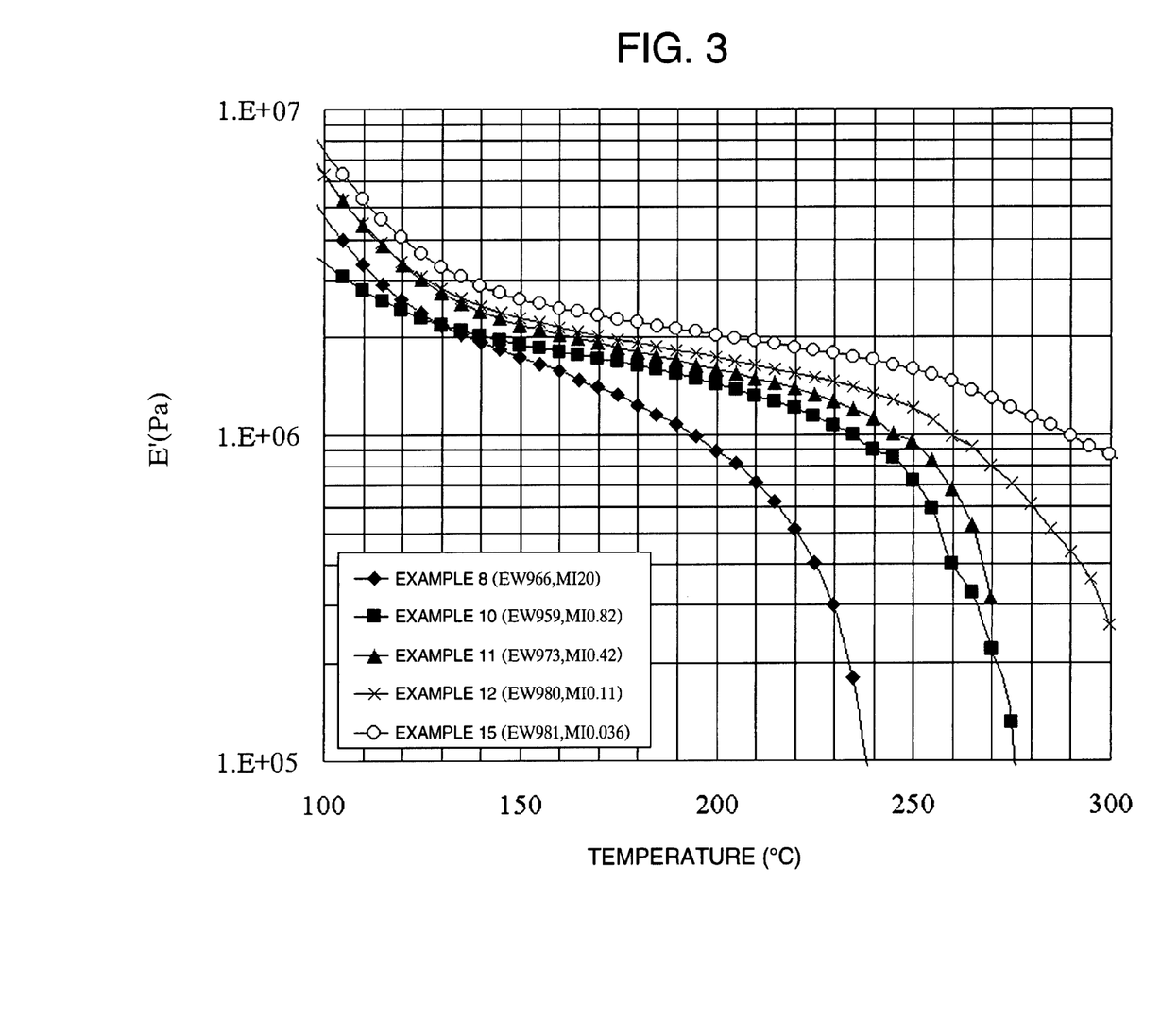
FIG. 3 is a graph showing the relationship between the temperatures and storage moduli on the film having $SO_3NH(Bu)_3$ as the ends of the side chains in Examples 8, 10 to 12, and 15.

Although the precursor of the ion exchange fluorocarbon resin of the present invention has normally a rubber-like appearance, it is considered that a slight quantity of crystal components are present, because the precursor contains fluorinated vinyl compounds such as TFE as copolymerizing components. For example, when the dynamic viscoelasticity of the precursor of the ion exchange fluorocarbon resin having a standard melt index is measured at 35 Hz, a sharp lowering of the storage modulus is generally observed between 150 and 250° C., which is considered to be a melt flow accompanying the melting of the above-described crystal components. The feature of the ion exchange fluorocarbon resin membrane of the present invention is to exhibit non-fluidity in a high-temperature range wherein a conventional ion exchange fluorocarbon resin membrane exhibits melt flow, and to manifest a certain mechanical strength (melt strength).

It has been well known that the phenomenon wherein a polymer manifests mechanical strength without flowing at the melting temperature of the crystal component or above occurs, for example, in ultra-high molecular weight polyethylene having a weight average molecular weight of 1,000,000 or more. It is considered that such a phenomenon is inherent in ultra-high molecular weight polymers, and occurs because the entanglement of molecular chains is extremely difficult to disentangle, acting as a sort of cross-linked point. Although the relationship between "molecular weight between entangling points" Me and "storage modulus" E' is represented by Me=ρRT/E' (where ρ is density, R is gas constant, and T is absolute temperature), the storage modulus, which is a requirement of the present invention, can be considered from the above-described relational expression to represent the molecular weight between entangling points of molecular chains in the molten state. Such a theory is described in detail, for example, in "Lecture-Rheology", (The Society of Rheology, Japan, Kobunshi Kankokai, 1992). The present invention first clarified the critical conditions to make an ion exchange fluorocarbon resin membrane manifest the above-described non-fluidity using the storage modulus as a main index, whereby the heat resistance of ion exchange fluorocarbon resin membranes could be improved without relying on treatments such as cross-linking. Furthermore, the present invention enabled the industrial utilization of the heat-resistant membrane by disclosing the specific method for forming ultra-low MI polymers, which had no practical forming means in the prior art.

(Material Polymers)

The precursor of an ion exchange fluorocarbon resin used in the present invention includes at least a binary copolymer of a fluorinated vinyl compound represented by the general formula $CF_2=CF-(OCF_2CFL)_n-O-(CF_2)_m-W$ and a fluorinated olefin represented by the general formula $CF_2=CFZ$, where, L is a F atom or a perfluoroalkyl group having 1 to 3 carbon atoms, n is an integer of 0 to 3, m is an integer of 1 to 3, and Z is H, Cl, F or a perflucroalkyl group having 1 to 3 carbon atoms. Further, W is a functional group convertible to $CO_2H$ or $SO_3H$ by hydrolysis, and as such a functional group, $SO_2F$, $SO_2Cl$, $SO_2Br$, COF, COCl, COBr, $CO_2CH_3$ or $CO_2C_2H_5$ are typically preferably used, and n is preferably 0 or 1.

Such an ion exchange fluorocarbon resin precursor can be synthesized by conventionally known means. For example, known methods include: a method wherein the above fluorinated vinyl compound is dissolved using polymerizing solvents such as chlorofluorocarbons, then allow them to react and polymerize with the fluorinated olefin gas (solution polymerization); a method of polymerization using the fluorinated vinyl compound itself as the polymerizing solvent without using a solvent such as chlorofluorocarbons (bulk polymerization); a method wherein the fluorinated vinyl compound and a fluorinated olefin gas are charged into an aqueous solution of an emulsifier to allow them to react and polymerize (emulsion polymerization); a method wherein the fluorinated vinyl compound and a fluorinated olefin gas are charged into an aqueous solution of an emulsifier such as a surfactant and alcohol to emulsify them, and allow them to react and polymerize (mini-emulsion polymerization, micro-emulsion polymerization); and further a method wherein the fluorinated vinyl compound and a fluorinated olefin gas are charged into an aqueous solution of a suspension stabilizer to allow them to react and polymerize (suspension polymerization). In the present invention, any of these polymerization methods can be used. As the fluorine-containing hydrocarbon used in solution polymerization, the compounds generally referred to as chlorofluorocarbons such as trichlorotrifluoroethane and 1,1,1,2,3,4,4,5,5,5-decafluoropentane can be preferably used.

(Equivalent Weight)

Although the equivalent weight (EW) of a the resin of the ion exchange fluorocarbon membrane of the present invention is not particularly limited, it is preferably 400 to 1,400, more preferably 600 to 1,200, and further preferably 700 to 1,000. Although a higher equivalent weight enhances mechanical strength of even a non-oriented membranes, it lowers ionic conductivity due to the lowering of the density of ion exchange groups as well. An excessively low equivalent weight is also not preferable because the strength is reduced.

(Melt Index)

The melt formability of the precursor of an ion exchange fluorocarbon resin is generally evaluated with the melt viscosity index known as melt index (MI). The melt index (JIS K-7210) used herein is the weight of a resin extruded from a specific orifice when a load of 2.16 kg is applied at 270° C. measured in grams per 10 minutes. Industry of ion exchange fluorocarbon resin membranes, precursors of ion exchange fluorocarbon resins having an MI of 10 to 50, which have good fluidity and excellent melt formability, are typically used.

Although the melt index (MI) (JIS K-7210) of the precursor of an ion exchange fluorocarbon resin of the present invention is not particularly limited, it is 10 or less, preferably 5 or less, more preferably 1 or less, especially preferably 0.5 or less, further preferably 0.4 or less, and extremely preferably 0.1 or less.

In the same EW, MI can be considered to be an index related to the molecular weight. However, when the EW is large (e.g., 1,000 or more), since the PTFE component is formed during polymerization, even during random copolymerization, the PTFE component acts as a sort of filler, the precursor may have a low MI regardless of insufficient entangling between molecules. In such a case, it is preferable to select a lower MI than in the case of an EW of less than 1,000. For example, although the melt index (JIS K-7210) of the precursor of the ion exchange fluorocarbon resin membrane of the present invention when EW is 1,000 or more is not particularly limited, it is generally 1 or less, preferably 0.5 or less, more preferably 0.4 or less, especially preferably 0.1 or less, further preferably 0.06 or less, and extremely preferably 0.03 or less.

(Membrane Thickness)

The thickness of an ion exchange fluorocarbon resin membrane of the present invention is 1 to 500 μm, preferably 5 to 100 μm and more preferably 10 to 50 μm. A membrane thickness below 1 μm tends to cause the above-described difficulty due to a diffusion of hydrogen or oxygen, along with difficulties such as damage of the membrane by a pressure difference and strain during handling of the fuel cell during manufacturing or in operation. On the other hand, a membrane thickness above 500 μm may have an insufficient performance as an ion exchange membrane because the membrane typically has a low ion permeability.

(Storage Modulus)

Heat resistance in the present invention is expressed through. the storage modulus at Tc. The Tc is an index of the fluidizing temperature of the polymer in the present invention, and can be considered to be the lower limit temperature at which various interactions by micro-crystallites and the ends of side chains are eliminated, and wherein the viscoelasticity is controlled only by the entangling between molecular chains. In the present invention, the heat resistance of an ion exchange fluorocarbon resin membrane when used in a fuel cell is determined by the value of the storage modulus at Tc. Although the fluidizing temperature of the ion exchange fluorocarbon resin membrane is basically estimated to correspond to the melting temperature of micro-crystallites, and therefore shift toward the lower temperature side with the lowering of EW, in the ion exchange fluorocarbon resin membrane (having $SO_3H$ as the ends of the side chains) used in a fuel cell, ideal behaviors related to the fluidizing temperature are concealed by the following two factors, and as a result, it is clear that the fluidizing temperature may not be suitable as the index of heat resistance.

The first factor which conceals ideal behaviors is sulfonic cross-linking of $SO_3H$ ends with one another. Cross-linking is formed by releasing one molecule of water from two molecules from $SO_3H$ ends. Since new cross-linked structures are formed one after the other during the measurement of the temperature dependence of storage modulus (during temperature elevation), even a low-molecular-weight polymer, which has no entangling between molecular chains, exhibits a high storage modulus at Tc. Since such sulfonic cross-linking is significantly formed at or above 220° C., a unique behavior is often observed wherein the storage modulus once lowered by the fluidizing temperature at, for example, around 200° C. rises again to 220° C. or above.

In order to prevent the formation of sulfonic cross-linking, although the protection of $SO_3H$ ends by salt substituting is effective, the second factor related thereto is the reversion phenomenon of Tg and Tc. Here, Tg is the peak temperature of loss tangent in the measurement of dynamic viscoelasticity of an ion exchange fluorocarbon resin membrane (having $SO_3H$ as the ends of the side chains). For example, in an ion exchange fluorocarbon resin membrane having a Tg of 120° C., an EW of 950 and an MI of 20, since the difference between the vicinity of the fluidizing temperature (200° C.) and Tg (120° C.) in the measurement of dynamic viscoelasticity is as large as 80° C., fluidizing can be clearly observed without being affected by Tg. Whereas in an ion exchange fluorocarbon resin membrane substituted by potassium ions (having $SO_3K$ as the ends of the side chains), although sulfonic cross linking can be prevented, fluidizing in the vicinity of Tc cannot be observed because of the presence of Tg in the vicinity of 270° C., which is higher than Tc. In other words, no membranes are fluidized up to the vicinity of 270° C.

The present inventors examined Tg for various salt-substituted ion exchange fluorocarbon resin membranes, and found that the Tg of the membrane wherein protons (hydrogen cations) in $SO_3H$ as the ends of the side chains are substituted by alkyl ammonium ions, in particular substituted by tributyl ammonium ions, is significantly lower than the Tg of the film wherein protons in $SO_3H$ as the ends of the side chains are substituted by alkali metal ions such as potassium ions or alkali earth metal ions (equal to or lower than the Tg of membranes having $SO_3H$ as the ends of the side chains). Fluidizing in the vicinity of Tc can be apparently observed.

Specifically, the storage modulus of the ion exchange fluorocarbon resin membrane according to the present invention is measured with the ends of the side chains substituted with tributyl ammonium ions, that is, the ends of the side chains are $SO_3NH(Bu)_3$.

The Tc of an ion exchange fluorocarbon resin membrane substituted by tributyl ammonium ions is defined by the following equations (1-1) to (1-3). For example, the Tc of the ion exchange fluorocarbon resin membrane having a Tg of 120° C. and an EW of 800 is calculated to be 197° C.; and the Tc of the ion exchange fluorocarbon resin membrane having an EW of 1025 is calculated to be 255° C.

$$Tc(°C.)=55+Tg (EW<750) \quad (1\text{-}1)$$

$$Tc(°C.)=0.444 \times EW-278+Tg (750 \leq EW<930) \quad (1\text{-}2)$$

$$Tc(°C.)=135+Tg (EW \geq 930) \quad (1\text{-}3)$$

where Tg designates the peak temperature of loss tangent in the dynamic viscoelasticity measurement of the ion exchange fluorocarbon resin membrane (having end of $SO_3H$ as the ends of the side chain).

The Tc equation of the present invention is composed of a flat region at low temperatures, a gradient region, and a flat region at high temperatures. For example, when the equation of the gradient region (Tc (° C.)=0.444×EW−278+Tg) is applied to the ion exchange fluorocarbon resin membrane (having $SO_3NH(Bu)_3$ as the ends of the side chains) having a Tg of 150° C. and an EW of 750, the Tc is calculated to be 205° C., and since the difference between Tg and Tc at the lower EW becomes 55° C. or less, the Tc that has been considered to be the flow of the main chain skeleton is strongly affected by Tg, which is the flow of the end of side chains (hereafter referred to as crossover). Specifically, although the Tc simply lowers depending on EW, since Tg is substantially constant regardless of EW, the Tc as the fluidizing temperature has the lower limit derived from Tg. The manifestation of the flat region at low temperatures has such reasons. On the other hand, although the reason for the manifestation of the flat region at high temperatures has not been known, it is presumed to probably be because the effect of the ends of side chains are significantly weakened at an EW of 930 or more unlike the flat region at low temperatures, and the action of micro-crystallites, not EW, becomes the main reason. The feature of the Tc equation of the present invention is that the Tc equation is applicable to any ion exchange fluorocarbon resin membrane described the above-described paragraph of "Material polymers", and the Tc can be uniquely determined from the Tg and EW of the ion exchange fluorocarbon resin membrane.

On the other hand, it has been known that the fluidizing temperature of an acid-type ion exchange fluorocarbon resin membrane is 10 to 100° C. lower than the fluidizing temperature of an ion exchange fluorocarbon resin membrane substituted with tributyl ammonium ions, and in addition, when the above-described ion exchange fluorocarbon resin membrane has sufficiently low Tg and/or EW, the synergic effect may lower the fluidizing temperature by as much as 200° C. In this case, fluidizing can be observed even in the acid-type ion exchange fluorocarbon resin membrane without being affected by sulfonic cross-linking (which becomes significant at 220° C. or above). Claim 2 of the present invention addresses an acid-type ion exchange fluorocarbon resin membrane (having $SO_3H$ as the ends of the side chains) characterized in that Tg is below 135° C. and EW is less than 950, as the above-described ion exchange fluorocarbon resin membrane that does not necessarily require substitution with tributyl ammonium ions.

The storage modulus (JIS K-7244) of such an acid-type ion exchange fluorocarbon resin membrane (having $SO_3H$ the ends of the side chains) at 200° C. is $0.8 \times 10^6$ Pa or more, preferably $1.0 \times 10^6$ Pa or more, more preferably $1.5 \times 10^6$ Pa or more, more preferably $1.8 \times 10^6$ Pa or more, further preferably $2.0 \times 10^6$ Pa or more, further more preferably $3.0 \times 10^6$ Pa or more, and especially more preferably $4.0 \times 10^6$ Pa or more.

The storage modulus (JIS K-7244) of such an acid-type ion exchange fluorocarbon resin membrane of the present invention (having $SO_3NH(Bu)_3$ as the ends of the side chains) at Tc is $0.8 \times 10^6$ Pa or more, preferably $1.0 \times 10^6$ Pa or more, more preferably $1.5 \times 10^6$ Pa or more, more preferably $1.8 \times 10^6$ Pa or more, further preferably $2.0 \times 10^6$ Pa or more, further more preferably $3.0 \times 10^6$ Pa or more, and especially more preferably $4.0 \times 10^6$ Pa or more.

The fluidity at a temperature of the fluidizing temperature or above can be expressed as the ratio of storage moduli before to after melting of crystal components. For example, in the case wherein the ends of the side chains are $SO_3H$, the ratio of the storage modulus at 150° C. to the storage modulus at 200° C. is 0.4 or more, preferably 0.5 or more, more preferably 0.6 or more, and further more preferably 0.7 or more. Whereas when the ends of the side chains are $SO_3NH(Bu)_3$, the ratio of the storage modulus at 150° C. to the storage modulus at 200° C. is 0.4 or more, preferably 0.5 or more, more preferably 0.6 or more, and further more preferably 0.7 or more. Furthermore, when the ends of the side chains are $SO_3NH(Bu)_3$ the ratio of the storage modulus at Tc−50° C. to the storage modulus at Tc is 0.4 or more, preferably 0.5 or more, more preferably 0.6 or more, and further more preferably 0.7 or more.

(Heat of Crystal Fusion at 270 to 350° C.)

As described in the paragraph entitled "Melt index", since the mixing of a PTFE component not only causes the storage modulus to be different from the object of the present invention, but also PTFE mixed without proper control brings about discontinuous change in mechanical properties in the boundary. The mixing of a PTFE component may easily cause the formation of pinholes due to stress concentration. The examples wherein PTFE is mixed without proper control include the case of forming PTFE chains by block copolymerization, and the case of intentionally forming PTFE particles during polymerization even in random copolymerization.

When the ion exchange fluorocarbon resin membrane is measured with DSC, a broad peak (half width: 50 to 100° C.) appears centered at 200° C. in micro-crystallites corresponding to the fluidizing temperature, whereas in the PTFE component considered to be unsuitable for the present invention, a composite peak of a considerably sharper peak (half width: 10 to 20° C.) and a broad peak can be observed between 270 and 350° C. because of large chain length. In the present invention, the heat of crystal fusion at 270 to 350° C. is 1 J/g or less, preferably 0.6 J/g or less, more preferably 0.4 J/g or less, further preferably 0.2 J/g or less, further more preferably 0.1 J/g or less, and most preferably 0.05 J/g or less.

(Equivalent Puncture Strength)

Although the equivalent puncture strength (a converted value per 25 µm of a puncture strength in the dry state) of an ion exchange fluorocarbon resin membrane of the present invention is not particularly limited, it is preferably 250 g or more, more preferably 300 g or more, and further preferably 350 g or more. An equivalent puncture strength less than 250 g leads to insufficient mechanical strength due to thinning of the membrane and may not be preferable because the thickening of the membrane is required. Although the upper limit of equivalent puncture strength is not particularly limited in the present invention, a membrane with a strength of 3,000 g or more is generally presumed to have a low water content and thus insufficient performance as an ion exchange membrane.

(High-temperature Breaking Strength)

Although the high-temperature breaking strength (breaking strength during tensile test) of the ion exchange fluorocarbon resin membrane of the present invention at 200° C. is not particularly limited, it is preferably 2 kg/cm$^2$ or more, more preferably 3 kg/cm$^2$ or more, further preferably 4 kg/cm$^2$ or more, and most preferably 5 kg/cm$^2$ or more. If the high-temperature breaking strength is less than 2 kg/cm$^2$, the ion exchange membrane may not exhibit sufficient performance in the initial properties and the long-term durability in the operation of the fuel cell at a temperature of 100° C. or above. Although the high-temperature breaking strength of the ion exchange fluorocarbon resin membrane of the present invention at 220° C. is not particularly limited, it is preferably 1 kg/cm$^2$ or more, more preferably 2 kg/cm$^2$ or more, further preferably 3 kg/cm$^2$ or more, further more preferably 4 kg/cm$^2$ or more, and most preferably 5 kg/cm$^2$ or more. Furthermore, although the high-temperature breaking strength of the ion exchange fluorocarbon resin membrane of the present invention at Tc is not particularly limited, it is preferably 2 kg/cm$^2$ or more, more preferably 3 kg/cm$^2$ or more, and further preferably 4 kg/cm$^2$ or more.

In addition, although the tensile strength at normal temperature can be improved by molecular orientation such as stretching, since many crystal components melt at high temperatures as described above, much of such molecular orientation is relaxed. In other words, the characteristics of the polymer itself from which the contribution of molecular orientation is excluded, especially the entangling between molecules are strongly reflected in the high-temperature breaking strength. It has been known that the time-temperature conversion rule can be generally applied to polymers in an amorphous state (including crystalline polymers in a molten state). According to the time-temperature conversion rule, the results of measurement at a high temperature (e.g., 200° C.) in a short time (e.g., 35 Hz) are considered to reflect the behavior at low temperatures (e.g., 100 to 120° C.) in a long time (e.g., several hours or more). In other words, the temperature at which the high-temperature break strength is measured in the present invention is established on the basis of the above-described point of view, combined with the object to conduct the evaluation of durability for a long time at low temperatures in a simpler and easier way.

Next, a method of manufacturing the ion exchange fluorocarbon resin membrane of the present invention will be described.

(Preferable Embodiment of a Manufacturing Method)

An ion exchange fluorocarbon resin membrane of the present invention is prepared through 1) a membrane-formation step and 2) a hydrolysis step.

(Membrane-formation Step)

As a method for forming a membrane from the precursor of an ion exchange fluorocarbon resin, any commonly known forming method can be suitably used, including powder press methods, melt forming methods (T-die methods, inflation methods, calendaring methods or the like) and casting methods. The casting methods includes methods wherein an ion exchange fluorocarbon resin is dispersed in a suitable medium, or methods including forming a sheet-like film from a polymerization reaction liquid itself, and then removing the dispersion medium. The resin temperature in melt forming using T-die methods is preferably 100 to 300° C., and more preferably 200 to 280° C. The resin temperature in melt forming by inflation methods is preferably 100 to 300° C., and more preferably 160 to 240° C. Sheets that are melt formed by these methods is cooled to the melting temperature or below using a chill roll or the like.

Since the precursor of an ion exchange fluorocarbon resin according to the present invention has a low melt index, it may be difficult to achieve the desired thickness of 1 to 500 µm by ordinary melt forming. In such a case, the desired thickness can be achieved by adding a plasticizer or the like to lower the viscosity thereof on melt forming, or by melt-forming a sheet thicker than desired, which sheet is mechanically thinned using various forming methods.

Although any plasticizer can be used as the plasticizer in the former method as long as it has the affinity with the precursor of the ion exchange fluorocarbon resin and can swell it, carbon dioxide, fluorine-containing hydrocarbons generally known as chlorofluorocarbons, or fluorine oil can be preferably used. Since these plasticizers have various boiling points, when a highly volatile plasticizer is used, a treatment such as compressing or chilling is preferable to prevent the evaporation of the plasticizer before, during or after forming.

The examples of the latter forming method include rolling using a rolling machine, longitudinal uniaxial stretching using a roll stretching machine, transversal uniaxial stretching using a tenter, sequential biaxial stretching using a tenter and a longitudinal rolling machine, and simultaneous biaxial stretching using a simultaneous biaxial tenter. For example, if a precursor having an MI of about 0.1 is used, the formation of the sheet having a thickness of about 100 µm using an ordinary T-die forming method is not unduly difficult if the T-die is specially designed. A precursor membrane having a thickness of 25 µm can be formed after forming a precursor sheet, or further hydrolyzing to form an ion exchange fluorocarbon resin membrane, and performing 2×2 stretching.

Although a preferable temperature range for stretching a precursor sheet is not particularly limited, stretching at a high temperature is preferable, because the precursor sheet of the present invention has a relatively high molecular weight and strong entangling between molecules compared to prior art. The lower limit of the temperature is preferably room temperature or above, more preferably 70° C. or above, further preferably 90° C. or above, further more preferably 110° C. or above, and most preferably 130° C. or above. It is preferable for avoiding the decomposition of the polymer that the stretching temperature does not exceed 300° C. After stretching the precursor sheet, it is preferable to perform hydrolysis in the state wherein the orientation is maintained to prevent relaxation of the orientation.

Similarly, although a preferable temperature range for stretching an ion exchange fluorocarbon resin membrane is not particularly limited, the lower limit of the temperature is preferably room temperature or above, more preferably 120° C. or above, further preferably 140° C. or above, and further more preferably 160° C. or above. After stretching the ion exchange fluorocarbon resin membrane, acid washing is preferable.

In any case, the molecules of the precursor of an ion exchange fluorocarbon resin membrane can be oriented two-dimensionally during the process of thinning. In this case, the mechanical strength is improved. On the other hand, although the precursor of an ion exchange fluorocarbon resin contains crystal components, it is essentially a rubber-like polymer and simple molecular orientation may cause undesirable dimensional changes or strength reduction by the relaxation of orientation due to aging. If such problems are significant, it is preferable to not impart molecular orientation in two-dimensional directions in the above-described thinning process. Methods for thinning without imparting two-dimensional molecular orientation include, for example, temperature elevation in the above-described thinning process, or the use of a viscosity-lowering agents such as plasticizers. Among them, when the viscosity of the precursor sheet is lowered using a highly volatile plasticizer, thinning can be performed without fear of the sublimation of the plasticizer from the precursor sheet, for example, by installing the thinning machine, such as a rolling machine, in a bath filled with the plasticizer. On the other hand, when two-dimensional molecular orientation is to be maintained, the molecular orientation is fixed by performing hydrolysis while maintaining molecular orientation during membrane forming. Dimensional change may be prevented, and at the same time, a high mechanical strength may be achieved.

(Hydrolysis Step)

As a method for hydrolysis, any commonly known methods may be used such as the method described in Japanese Patent No. 2753731, wherein the precursor of an ion exchange group of an oriented membrane is converted to a metal-salt-type ion exchange group using a solution of alkali hydroxide, followed by converting to an acid type ($SO_3H$ or COOH) ion exchange group using an acid such as sulfonic acid and hydrochloric acid. These conversions are known to those skilled in the art, and described in Examples of the present invention. In the present invention, stretching or heat treatment may be performed during the hydrolysis step.

(Manufacturing Method for Membrane/electrode Assembly)

Next, a method for manufacturing a membrane/electrode assembly (MEA) will be described. MEA is manufactured by bonding electrodes to an ion exchange fluorocarbon resin membrane. An electrode is composed of fine particles of a catalyst metal and a conducting material supporting them, and additionally contains a water repellant as required. The catalyst used for the electrode is not particularly limited as long as it is a metal promoting an oxidation reaction of hydrogen and a reduction reaction by oxygen. Catalysis include platinum, gold, silver, palladium, iridium, rhodium, ruthenium, iron, cobalt, nickel, chromium, tungsten, manganese, vanadium and alloys thereof. Of these metals, platinum is mainly used. The conducting material may be any electron-conductive material such as various kinds of metals and carbon materials. The carbon materials include, for example, carbon black such as furnace black, channel black and acetylene black; activated carbon; and graphite, used alone or in combination. The water repellant is preferably a fluorine-containing resin having water repellency, and more preferably one having excellent heat resistance and oxidation resistance. Such materials include, for example, polytetrafluoroethylene, tetrafluoroethylene-perfluoroalkylvinylether copolymer, and tetrafluoroethylenehexafluoropropylene copolymer. As such an electrode, for example, an electrode made by E-TEK is widely used.

In order to manufacture MEA from the above-described electrode and an ion exchange resin membrane, for example, the following method is used. An ion exchange fluorocarbon resin is dissolved in a mixed solvent of alcohol and water to prepare a solution, in which carbon-supporting platinum, as an electrode material, is dispersed to make a paste. This paste is then applied onto PTFE sheets in a specified amount and dried. Then, said PTFE sheets are placed so that the coated surfaces face each other with an ion exchange resin membrane being sandwiched between the coated surfaces. These are the bonded using a hot press. The temperature of the hot press depends on the type of ion exchange resin membrane, but usually is 100° C. or above, preferably 130° C. or above, and more preferably 150° C. or above. Another method of manufacturing MEA is described in "J. Electrochem. Soc., Vol. 139, No. 2, L28–L30 (1992)." According to this method, an ion exchange fluorocarbon resin is dissolved in a mixed solvent of alcohol and water, and a solution converting to $SO_3Na$ type is prepared. To this solution, platinum-supporting carbon is added to obtain an ink-like solution. The ink-like solution is applied onto a surface of an ion exchange fluorocarbon resin membrane, which has been converted to $SO_3Na$ type in advance. The solvent is then removed. Finally, all the ion exchange groups are converted again to the $SO_3H$ type to obtain an MEA. The present invention can be applied to such an MEA.

(Manufacturing Method of a Fuel Cell)

Next, a method for manufacturing a solid-polyelectrolyte-type fuel cell will be described. A solid-polyelectrolyte-type fuel cell is composed of an MEA, current collectors, a fuel-cell frame, a gas-supplying device and the like. Among them, the current collector (bipolar plate) is a flange made of graphite or metal, having gas passages at the surface or the like, which function to transfer electrons to an external load circuit, and supply hydrogen or oxygen to the MEA surface. The fuel cell can be fabricated by inserting the MEA between such current collectors and piling up a plurality of the laminates. The fuel cell is operated by supplying hydrogen to one electrode, and oxygen or air to the other electrode. A higher operating temperature of the fuel cell is preferable because the catalytic activity is enhanced, but the operating temperature is usually 50 to 100° C. at which the water content is easily controlled. On the other hand, a reinforced ion exchange membrane of the present invention may be operated at 100 to 150° C. by improving strength at high temperature and in high humidity. Although a higher feed pressure of oxygen or hydrogen is preferable for increased output of the fuel cell, the pressure is preferably adjusted within a suitable pressure range to reduce the probability of contact of both materials caused by breakdown of the membrane or the like.

The present invention will be described in more detail by the following Examples. Testing methods for the properties shown in the Examples are as follows.

(1) Melt Index

The melt index of the precursor of an ion exchange fluorocarbon resin measured in accordance to JIS K-7210 at a temperature of 270° C. and under a load of 2.16 kg was made the MI (g/10 min).

(2) Membrane Thickness

An acid-type ion exchange membrane was allowed to stand for 12 hours or more in a constant-temperature chamber maintained at a temperature of 23° C. and a relative humidity of 65%. The thickness was measured with a membrane thickness gauge (made by Toyo Seiki Seisaku-Sho Ltd.: B-1).

(3) Equivalent Puncture Strength

An acid-type ion exchange membrane was allowed to stand for 12 hours or more in a constant-temperature chamber maintained at a temperature of 23° C. and a relative humidity of 65%. A puncture test was conducted using a handy compression tester (KES-G5 made by KATO TECH Co. Ltd.) under test conditions of a radius of curvature of the probe tip of 0.5 mm, and a puncture speed of 2 mm/sec. The puncture strength (g) was defined as the maximum puncture load. The equivalent puncture strength (g/25 μm) was calculated from the puncture strength multiplied by 25 (μm)/membrane thickness (μm).

(4) High-temperature Break Strength

An acid-type ion exchange membrane was allowed to stand for 12 hours or more in a constant-temperature chamber maintained at a temperature of 23° C. and a relative humidity of 65%. A sample cut to a membrane width of 5 mm was placed in a tensile tester (Shimadzu Corporation: AGS-1kNG) set at 220° C. The tensile test was conducted with a distance between chucks of 20 mm and a pulling speed of 10%/sec to obtain the breaking strength E (kg/cm$^2$) at 220° C.

(5) Water Content

After an acid-type ion exchange membrane was immersed in purified water at 25° C. for 30 minutes, water on the membrane surface was wiped off, and the membrane in the water-containing state was weighed at 23° C. Thereafter, the sample was dried at 110° C. for 1 hour or more, and the sample in the dry state was weighed taking care not to absorb moisture. The water content, W (%), was determined from these values using the following equation:

$$W=\{(Wa-Wb)/Wb\}\times 100$$

where, Wa is the weight in the water-containing state (g) and Wb is the weight in the dry state (g).

(6) Storage Modulus (Ion Exchange Fluorocarbon Resin Precursor Membrane (Having SO$_2$F as the Ends of the Side Chains))

A sample of a membrane having a width of 5 mm cut from the precursor membrane was placed in a dynamic viscoelasticity meter (IT Measurement & Control Co. Ltd.: DVA-200), and the dynamic viscoelesticity in the tensile mode was measured in accordance with JIS K-7244 with a distance between chucks of 20 mm, a strain of 0.1%, a frequency of 35 Hz, and a temperature elevation speed of 5° C./min to determine the storage modulus E' (Pa) at a predetermined temperature.

(7) Storage Modulus (Ion Exchange Fluorocarbon Resin Membrane (Having SO$_3$H the Ends of the Side Chains))

A sample of a membrane width of 5 mm cut from an acid-type ion exchange resin membrane which was allowed to stand for 12 hours or more in a constant temperature chamber maintained at a temperature of 23° C. and a relative humidity of 65% was placed in a dynamic viscoelesticity meter (IT Measurement & Control Co. Ltd.: DVA-200), and the dynamic viscoelesticity in the tensile mode was measured in accordance with JIS K-7244 with a distance between chucks of 20 mm, a strain of 0.1%, a frequency of 35 Hz, and a temperature elevation speed of 5° C./min to determine the storage modulus E' (Pa) at a predetermined temperature.

(8) Storage Modulus (Ion Exchange Fluorocarbon Resin Membrane (Having SO$_3$NH(Bu)$_3$ as the Ends of the Side Chains))

An acid-type ion exchange resin membrane was immersed in 50 ml of a tributyl amine solution at about 23° C., and allowed to stand for 12 hours or more with stirring every 3 to 4 hours. The sample was taken out of the solution, and tributyl amine on the membrane surface was washed with a large quantity of water. After allowing the sample to remain for 12 hours or more in a constant temperature chamber maintained at a temperature of 23° C. and a relative humidity of 65%, the sample of a membrane having a width of 5 mm cut from the precursor membrane was set in a dynamic viscoelasticity meter (IT Measurement & Control Co. Ltd.: DVA-200), and the dynamic viscoelesticity in the tensile mode was measured in accordance with JIS K-7244 with a distance between chucks of 20 mm, a strain of 0.1%, a frequency of 35 Hz, and a temperature elevation speed of 5° C./min to determine the storage modulus E' (Pa) at a predetermined temperature.

(9) Heat of Crystal Fusion at 270 to 350° C.

About 20 mg of an ion exchange fluorocarbon resin precursor membrane (accurately weighed) was placed in a sealed Al sample vessel, and heated from 25° C. to 380° C. at a temperature elevation speed of 20° C./min using a DSC instrument (Parkin-Elmer: Pyris-1) to obtain a DSC curve. From the difference between this DSC curve and the DSC curve previously obtained from the sealed Al sample vessel alone, a differential DSC curve was again calculated, and the endothermic quantity of the peak of crystal fusion between 270° C. and 350° C. in the differential DSC curve-was calculated.

(10) Equivalent Weight

About 0.05 to 0.10 g of an acid-type ion exchange membrane was immersed in 30 ml of a saturated NaCl aqueous solution at 25° C. The solution was allowed to stand for 30 minutes while stirring, and neutralization-titrated with a 0.01-N sodium hydroxide aqueous solution using phenolphthalein as an indicator, to an equivalent point where the value indicated by a pH meter (Toko Chemical Laboratories Co., Ltd.: TPX-90) was within a range between 6.95 and 7.05. The Na-type ion exchange resin membrane obtained after the neutralization was rinsed with purified water, then vacuum dried and weighed. The equivalent weight, EW (g/eq), was obtained from the equivalents of sodium hydroxide required for neutralization, M (mmol) and the weight of the Na-type ion exchange resin membrane, W (mg) using the following formula:

$$EW=(W/M)-22$$

(11) Horizontal Ionic Conductivity at 25° C.

An acid-type ion exchange membrane was cut into a strip with a width of 1 cm, and immersed in purified water at 25°

C. for 1 hour or more. The immersed membrane was cut again accurately into a strip with a width of 1 cm, and on the surface of the membrane, 6 electrode wires of a diameter of 0.5 mm were contacted in parallel at an interval of 1 cm. After allowing the sample to stand for 12 hours or more in a constant-temperature chamber adjusted to a temperature of 25° C. and a relative humidity of 98%, the resistance was measured by an A.C. impedance method (10 kHz), and the resistance per unit length was determined from the electrode distance and the resistance. The horizontal ionic conductivity at 25° C., Z (S/cm), was calculated using this value from the following equation:

$$Z=1/\text{membrane thickness (cm)}/\text{membrane width(cm)}/\text{resistance per unit length (}\Omega/\text{cm)}.$$

EXAMPLE 1

In a 20 liter stainless steel autoclave, 17.61 kg of $CF_2$=CF—O—$CF_2$CF($CF_3$)—O—$CF_2CF_2$—$SO_2$F was fed, purged with nitrogen, and then charged with tetrafluoro ethylene (TFE, $CF_2$=$CF_2$). After adjusting the temperature to 25° C. and the pressure of TFE to 0.645 MPa-G (gauge pressure), 106 g of a monomer solution containing 5 wt % (n-$C_3F_7$COO—)$_2$ was added to carry out polymerization. The polymerization was carried out for 30 minutes while intermittently feeding TFE from outside the polymerization vessel, and lowering the TFE pressure from an initial value of 0.645 MPa-G to a final value of 0.643 MPa-G. After purging TFE in the polymerization vessel system with nitrogen and reducing the presure to atmospheric pressure, a dispersion liquid of the ion exchange fluorocarbon resin precursor containing a monomer of a solid ratio of 8.4 wt % as a dispersion medium was obtained. A quantity of methanol equal to three times the volume of the dispersion liquid was added to the dispersion liquid to precipitate a slurry. It is allowed to stand to remove the supernatant. The supernatant is removed by washing with about 0.5 l of a solution of methanol/CFC113=1/2 (volume ratio). The washing was repeated 3 times. The sample was dried for 16 hours at 110° C. under a reduced pressure to yield 420.8 g of a powder. The equivalent weight and the melt index of the powder (completely solidified ion exchange fluorocarbon resin precursor) were 928 and 0.052, respectively.

The above-described powder was press-formed into a precursor membrane with a thickness of 53.6 μm. The precursor membrane was immersed in a hydrolysis bath (DMSO:KOH:water=5:30:65) heated to 95° C. for 15 minutes to obtain an ion exchange fluorocarbon resin membrane substituted with potassium ions. The membrane was washed sufficiently with water and immersed in purified water of a temperature of 90° C. for 2 hours. Then, the membrane was immersed in a 2-N HCl bath heated to 65° C. for 15 minutes to obtain an ion exchange fluorocarbon resin membrane having acid-type ion exchange groups. The membrane was washed sufficiently with water and dried to obtain a dried film with a thickness of 53.6 μm. The characteristics of the obtained ion exchange fluorocarbon resin membrane are shown in Table 1.

EXAMPLE 2

An ion exchange fluorocarbon resin membrane with a thickness of 53.0 μm was formed in the same manner as in Example 1 except that the EW was 950 and the MI was 20. It was evaluated similarly. The characteristics of the obtained ion exchange fluorocarbon resin membrane are shown in Table 1. Since this membrane has a higher EW than the membrane of Example 1, the equivalent puncture strength at normal temperature was higher than the strength of Example 1, but the storage modulus at 200° C. was lower than the storage modulus of the membrane of Example 1. This shows that the physical entangling is weak due to the lower molecular weight of the membrane of Example 2, and that melt flow was beginning.

EXAMPLES 3 TO 25

Ion exchange fluorocarbon resin membranes having various EWs and MIs were obtained in the same manner as in Example 1 except that the immersing time in the hydrolysis bath was 1 hour and the immersing time in the hydrochloric acid bath was 12 hours or more. The characteristics of these ion exchange fluorocarbon resin membranes are shown in Tables 2 to 4.

EXAMPLES 26 TO 30

Ion exchange fluorocarbon resin membranes having various EWs and MIs were obtained in the same manner as in Example 2 except that the $CF_2$=CF—O—$CF_2CF_2$—$SO_2$F and tetrafluoroethylene were polymerized by emulsion polymerization. The characteristics of these ion exchange fluorocarbon resin membranes are shown in Table 5.

EXAMPLE 31

The ion exchange fluorocarbon resin membranes of Example 7 and Example 14 were immersed in an aqueous solution of water/methanol=25/75 (volume ratio), and heated for 8 hours at 160° C. in an autoclave. After cooling and removal, both ion exchange fluorocarbon resin membranes were dissolved, and no residual weight (gel content) was observed. These results show that these membranes were not cross-linked, and exhibited a high heat resistance.

EXAMPLE 32

The ion exchange fluorocarbon resin precursor membrane of Example 14 was press-formed at 270° C. to obtain a precursor membrane of a thickness of 116 μm. The precursor membrane was subjected to 2×2 times simultaneous biaxial stretching at a stretching temperature of 100° C. using a batch-type simultaneous biaxial stretching machine (Toyo Seiki Co. Ltd.). After stretching, a square stainless steel frame (double-sided adhesive tape was adhered on one side) was attached to the precursor membrane, and the precursor membrane was removed from the simultaneous biaxial stretching machine maintaining orientation. Furthermore, another frame was attached to the opposite side of the membrane, and the total system was firmly fixed using a clamp. The precursor membrane in this state was immersed in a hydrolysis bath (DMSO:KOH:water=5:30:65) heated to 95° C. for 1 hour to obtain an ion exchange fluorocarbon resin membrane substituted with potassium ions. This was sufficiently washed with water, and immersed for 15 minutes in a 2-N hydrochloric acid bath heated to 65° C. to obtain an ion exchange fluorocarbon resin membrane. This was sufficiently washed with water, and dried to obtain a dried membrane with a thickness of 51 μm.

EXAMPLE 33

The powder of an ion exchange fluorocarbon resin precursor was obtained in the same manner as in Example 26, except that the MI was 0.2 and the EW was 760. The powder was pelletized twice using a 25-mm uniaxial extruder with a barrel temperature of 270° C. and a rotation speed of 11 rpm. Then, a T-die was fixed to the same uniaxial extruder, and sheet forming was performed to obtain a precursor membrane of a thickness of 110 μm. At this time, when the thinning of the precursor membrane was tried by elevating the speed of take-up device, breakdown of the membrane occurred. The precursor film was stretched and hydrolyzed in the same manner as in Example 32 to obtain an ion exchange fluorocarbon resin membrane. This was sufficiently washed with water, and dried to obtain a dried membrane of a thickness of 54 μm.

INDUSTRIAL APPLICABILITY

Since the ion exchange fluorocarbon resin membrane of the present invention excels in heat resistance, it has excellent characteristics as the ion exchange fluorocarbon resin membrane for the operation of a fuel cell at a high temperature.

TABLE 1

|  | Example 1 | Example 2 |
| --- | --- | --- |
| EW (g/eq) | 928 | 950 |
| MI (g/10 min) | 0.052 | 20 |
| Membrane thickness (μm) | 53.6 | 56 |
| Equivalent puncture strength (g/25 μm) | 320 | 300 |
| Water content (%) | 30 | 29 |
| Storage modulus at 150° C. (Pa) | $2.7 \times 10^6$ | $2.7 \times 10^6$ |
| Storage modulus at 200° C. (Pa) | $2.0 \times 10^6$ | ※$1.0 \times 10^6$ |
| Storage modulus at 220° C. (Pa) | $1.8 \times 10^6$ | Not measurable because of break |
| 200° C./150° C. Storage modulus ratio | 0.73 | ※0.33 |
| Molecular weight between intertwining point at 200° C. | 3930 | ※7860 |
| High-temperature breaking strength at 200° C. (kg/cm$^2$) | 5.7 | 1.2 |
| High-temperature breaking strength at 220° C. (kg/cm$^2$) | 3.3 | 0.01 |

※The value measured at 195° C. was used because the sample was broken at below 200° C. The storage modulus at 200° C. is considered to be less than $1.0 \times 10^6$.

TABLE 2

|  |  | Example 3 | Example 4 | Example 5 | Example 6 | Example 7 |
| --- | --- | --- | --- | --- | --- | --- |
| EW | g/eq | 826 | 812 | 812 | 810 | 820 |
| MI | g/10 min | 6.5 | 2.5 | 0.56 | 0.1 | 0.04 |
| Tg | ° C. | 118 | 115 | 120 | 119 | 121 |
| Membrane thickness | μm | 95.2 | 94.5 | 140.4 | 185.1 | 143.3 |
| Equivalent puncture strength | g/25 μm | 260 | 260 | 240 | 210 | 240 |
| Water content | % | 42.3 | 43.1 | 38.2 | 39.6 | 40.3 |
| Ionic conductivity | S/cm | 0.13 | 0.13 | 0.13 | 0.12 | 0.12 |
| E'(150° C.):SO$_3$H | Pa | 1.8E+06 | 2.1E+06 | 2.4E+06 | 2.3E+06 | 2.2E+06 |
| E'(200° C.):SO$_3$H | Pa | 1.3E+04 | 2.2E+04 | 1.2E+06 | 1.7E+06 | 1.9E+06 |
| E'(220° C.):SO$_3$H | Pa | broken | broken | 3.9E+05 | 1.4E+06 | 1.7E+06 |
| E'(200° C.)/E'(150° C.) | — | 0.01 | 0.01 | 0.50 | 0.74 | 0.86 |
| Me(200° C.):SO$_3$H | — | 605000 | 357500 | 6550 | 4630 | 4140 |
| Tc:TBA | ° C. | 206.4 | 197.2 | 202.4 | 200.3 | 206.8 |
| E'(Tc):TBA | Pa | broken | 6.9E+04 | 6.2E+05 | 1.1E+06 | 1.1E+06 |
| E'(Tc-50):TBA | Pa | 7.6E+05 | 9.3E+05 | 1.2E+06 | 1.4E+06 | 1.3E+06 |
| E'(Tc)/E'(Tc-50) | — | — | 0.07 | 0.52 | 0.79 | 0.85 |
| High-temperature breaking strength (220° C.) | kg/cm$^2$ | 0.2 | 0.9 | 2.2 | 2.9 | 3.4 |
| Heat of crystal fusion | J/g | <0.05 | <0.05 | <0.05 | <0.05 | <0.05 |

TABLE 3

|  |  | Example 8 | Example 9 | Example 10 | Example 11 | Example 12 |
| --- | --- | --- | --- | --- | --- | --- |
| EW | g/eq | 966 | 951 | 959 | 973 | 980 |
| MI | g/10 min | 20 | 6.7 | 0.82 | 0.42 | 0.11 |
| Tg | ° C. | 123 | 124 | 123 | 123 | 128 |
| Membrane thickness | μm | 69.6 | 115.5 | 141.6 | 133.2 | 150.6 |
| Equivalent puncture strength | g/25 μm | 300 | 300 | 320 | 320 | 320 |
| Water content | % | 24.7 | 26.2 | 25 | 24.1 | 23.3 |
| Ionic conductivity | S/cm | 0.09 | 0.09 | 0.09 | 0.08 | 0.08 |

TABLE 3-continued

|  |  |  |  |  |  |  |
|---|---|---|---|---|---|---|
| E'(150° C.):SO₃H | Pa | 3.1E+06 | 2.8E+06 | 3.0E+06 | 2.9E+06 | 4.0E+06 |
| E'(200° C.):SO₃H | Pa | 9.3E+05 | 5.2E+05 | 2.0E+06 | 1.7E+06 | 2.6E+06 |
| E'(220° C.):SO₃H | Pa | 3.3E+04 | 2.0E+04 | 1.6E+06 | 1.4E+06 | 2.4E+06 |
| E'(200° C.)/E'(150° C.) | — | 0.30 | 0.19 | 0.67 | 0.59 | 0.65 |
| Me(200° C.):SO₃H | — | 8460 | 15130 | 3930 | 4630 | 3030 |
| Tc:TBA | ° C. | 257.6 | 258.7 | 257.6 | 258.0 | 263.2 |
| E'(Tc):TBA | Pa | broken | broken | 4.8E+05 | 7.1E+05 | 9.3E+05 |
| E'(Tc-50):TBA | Pa | 7.5E+05 | 9.0E+05 | 1.3E+06 | 1.5E+06 | 1.6E+06 |
| E'(Tc)/E'(Tc-50) | — | — | — | 0.37 | 0.47 | 0.58 |
| High-temperature breaking strength (220° C.) | kg/cm² | 0.2 | 0.3 | 1.7 | 2.6 | 3.7 |
| Heat of crystal fusion | J/g | <0.05 | <0.05 | <0.05 | <0.05 | <0.05 |

|  | Example 13 | Example 14 | Example 15 | Example 16 | Example 17 | Example 18 |
|---|---|---|---|---|---|---|
| EW | 951 | 968 | 981 | 1003 | 979 | 935 |
| MI | 0.07 | 0.05 | 0.036 | 0.01 | 0.003 | 0.0003 |
| Tg | 128 | 126 | 126 | 126 | 129 | 128 |
| Membrane thickness | 215.9 | 195.5 | 215.8 | 227.3 | 213 | 270.6 |
| Equivalent puncture strength | 280 | 290 | 290 | 280 | 280 | 250 |
| Water content | 26 | 24.9 | 22.5 | 22.9 | 23.7 | 26.8 |
| Ionic conductivity | 0.09 | 0.08 | 0.08 | 0.07 | 0.09 | 0.09 |
| E'(150° C.):SO₃H | 4.1E+06 | 3.4E+06 | 3.4E+06 | 3.7E+06 | 3.5E+06 | 3.3E+06 |
| E'(200° C.):SO₃H | 2.7E+06 | 2.3E+06 | 2.4E+06 | 2.5E+06 | 2.3E+06 | 2.4E+06 |
| E'(220° C.):SO₃H | 2.5E+06 | 2.2E+06 | 2.3E+06 | 2.4E+06 | 2.2E+06 | 2.3E+06 |
| E'(200° C.)/E'(150° C.) | 0.66 | 0.68 | 0.71 | 0.68 | 0.66 | 0.73 |
| Me(200° C.):SO₃H | 2910 | 3420 | 3280 | 3150 | 3420 | 3280 |
| Tc:TBA | 263.0 | 261.0 | 261.2 | 260.6 | 264.2 | 262.7 |
| E'(Tc):TBA | 1.0E+06 | 1.0E+06 | 1.4E+06 | 1.2E+06 | 1.3E+06 | 1.2E+06 |
| E'(Tc-50):TBA | 1.5E+06 | 1.4E+06 | 1.9E+06 | 1.7E+06 | 1.8E+06 | 1.6E+06 |
| E'(Tc)/E'(Tc-50) | 0.67 | 0.71 | 0.74 | 0.71 | 0.72 | 0.75 |
| High-temperature breaking strength (220° C.) | 3.9 | 3.9 | 4.6 | 4.7 | 5.7 | 5.2 |
| Heat of crystal fusion | <0.05 | <0.05 | <0.05 | <0.05 | <0.05 | <0.05 |

TABLE 4

|  |  | Example 19 | Example 20 | Example 21 | Example 22 | Example 23 | Example 24 | Example 25 |
|---|---|---|---|---|---|---|---|---|
| EW | g/eq | 1043 | 1037 | 1041 | 1050 | 1085 | 1135 | 1048 |
| MI | g/10 min | 20 | 1 | 0.3 | 0.03 | 0.0007 | 0.000007 | 0.12 |
| Tg | ° C. | 124 | 120 | 128 | 129 | 130 | 133 | 124 |
| Membrane thickness | μm | 61.4 | 113.6 | 153.5 | 198.3 | 229.8 | 206.8 | 184.7 |
| Equivalent puncture strength | g/25 μm | 330 | 320 | 310 | 320 | 300 | 290 | 310 |
| Water content | % | 19.9 | 19.9 | 20.2 | 19.3 | 19 | 16.7 | 19.5 |
| Ionic conductivity | S/cm | 0.07 | 0.08 | 0.07 | 0.07 | 0.09 | 0.06 | 0.07 |
| E'(150° C.):SO₃H | Pa | 3.9E+06 | 3.9E+06 | 4.4E+06 | 4.1E+06 | 5.5E+06 | 7.0E+06 | 4.6E+06 |
| E'(200° C.):SO₃H | Pa | 1.3E+06 | 2.5E+06 | 2.5E+06 | 2.6E+06 | 3.1E+06 | 3.2E+06 | 2.9E+06 |
| E'(220° C.):SO₃H | Pa | 2.9E+04 | 2.0E+06 | 2.2E+06 | 2.4E+06 | 2.8E+06 | 2.8E+06 | 2.6E+06 |
| E'(200° C.)/E'(150° C.) | — | 0.33 | 0.64 | 0.57 | 0.63 | 0.56 | 0.46 | 0.63 |
| Me(200° C.):SO₃H | — | 6050 | 3150 | 3150 | 3030 | 2540 | 2460 | 2710 |
| Tc:TBA | ° C. | 259.2 | 254.7 | 263.4 | 264.2 | 264.6 | 267.6 | 259.0 |
| E'(Tc):TBA | Pa | 2.9E+04 | 8.0E+05 | 1.1E+06 | 1.7E+06 | 1.8E+06 | 2.0E+06 | 1.3E+06 |
| E'(Tc-50):TBA | Pa | 1.0E+06 | 1.7E+06 | 1.9E+06 | 2.3E+06 | 2.3E+06 | 2.3E+06 | 2.1E+06 |
| E'(Tc)/E'(Tc-50) | — | 0.03 | 0.47 | 0.58 | 0.74 | 0.78 | 0.87 | 0.62 |
| High-temperature breaking strength (220° C.) | kg/cm² | 1.4 | 2.8 | 4.2 | 6.9 | 11.5 | 20.3 | 5.7 |
| Heat of crystal fusion | J/g | <0.05 | <0.05 | <0.05 | <0.05 | <0.05 | <0.05 | <0.05 |

TABLE 5

|  |  | Example 26 | Example 27 | Example 28 | Example 29 | Example 30 |
|---|---|---|---|---|---|---|
| EW | g/eq | 823 | 843 | 947 | 980 | 776 |
| MI | g/10 min | 5.5 | 0.07 | 13 | 1.3 | 0.1 |
| Tg | °C. | 150 | 157 | 151 | 153 | 150 |
| Membrane thickness | μm | 112.8 | 289.7 | 104.6 | 218.8 | 118.4 |
| Equivalent puncture strength | g/25 μm | 320 | 280 | 300 | 340 | 330 |
| Water content | % | 25.7 | 20.4 | 16.9 | 15 | 26.9 |
| Ionic conductivity | S/cm | 0.09 | 0.08 | 0.06 | 0.06 | 0.09 |
| E'(150° C.):SO$_3$H | Pa | 1.8E+07 | 3.6E+07 | 3.9E+07 | 3.9E+07 | 2.1E+07 |
| E'(200° C.):SO$_3$H | Pa | 3.1E+06 | 3.9E+06 | 4.9E+06 | 4.3E+06 | 3.4E+06 |
| E'(220° C.):SO$_3$H | Pa | 2.1E+06 | 3.2E+06 | 3.6E+06 | 2.7E+06 | 2.9E+06 |
| E'(200° C.)/E'(150° C.) | — | 0.17 | 0.11 | 0.13 | 0.11 | 0.16 |
| Me(200° C.):SO$_3$H | — | 2540 | 2020 | 1610 | 1830 | 2310 |
| Tc:TBA | °C. | 237.2 | 253.1 | 286.2 | 288.2 | 216.5 |
| E'(Tc):TBA | Pa | 6.8E+05 | 2.3E+06 | broken | 4.6E+05 | 1.7E+06 |
| E'(Tc-50):TBA | Pa | 2.0E+06 | 3.0E+06 | 8.5E+05 | 2.5E+06 | 2.9E+06 |
| E'(Tc)/E'(Tc-50) | — | 0.34 | 0.77 | — | 0.18 | 0.59 |
| High-temperature breaking strength (220° C.) | kg/cm$^2$ | 2.1 | 10.9 | 3.4 | 9.8 | 10.1 |
| Heat of crystal fusion | J/g | <0.05 | <0.05 | 0.40 | 0.50 | <0.05 |

The invention claimed is:

1. A membrane of an ion exchange fluorocarbon resin comprising a copolymer substantially composed of the following repeating units (A) and (B):

where X is a F atom or a perfluoroalkyl group having 1 to 3 carbon atoms, n is an integer of 0 to 3, m is an integer of 1 to 3, Z is H, Cl, F or a perfluoroalkyl group having 1 to 3 carbon atoms and W' is CO$_2$H or SO$_3$H, and having, after substituted with tributyl ammonium ions, a storage modulus (JIS K-7244) at a temperature of not less than Tc represented by the following general equations (1-1) to (1-3) of 0.8×10$^6$ Pa or more, and a heat of crystal fusion at 270 to 350° C. of 1 J/g or less:

$$Tc\ (°C.)=55+Tg\ (EW<750) \quad (1\text{-}1)$$

$$Tc\ (°C.)=0.444\times EW-278+Tg\ (750\leq EW<930) \quad (1\text{-}2)$$

$$Tc\ (°C.)=135+Tg\ (EW\geq 930) \quad (1\text{-}3)$$

where Tg designates the peak temperature of loss tangent in the dynamic viscoelasticity measurement of the ion exchange fluorocarbon resin membrane (having SO$_3$H as ends of side chains).

2. A membrane of an ion exchange fluorocarbon resin comprising a copolymer substantially composed of the following repeating units (A) and (B):

where X is a F atom or a perfluoroalkyl group having 1 to 3 carbon atoms, n is an integer of 0 to 3, m is an integer of 1 to 3, Z is H, Cl, F or a perfluoroalkyl group having 1 to 3 carbon atoms and W' is CO$_2$H or SO$_3$H, and having a storage modulus (JIS K-7244) of 1.0×10$^6$ Pa or more, a heat of crystal fusion at 270 to 350° C. of 1 J/g or less, an equivalent weight of 950 or less, and a Tg of 135° C. or above.

3. A membrane of an ion exchange fluorocarbon resin comprising a copolymer substantially composed of the following repeating units (A) and (B):

where X is a F atom or a perfluoroalkyl group having 1 to 3 carbon atoms, n is an integer of 0 to 3, m is an integer of 1 to 3, Z is H, Cl, F or a perfluoroalkyl group having 1 to 3 carbon atoms and W' is CO$_2$H or SO$_3$H, and having, after substituted with tributyl ammonium ions, a storage modulus (JIS K-7244) at a temperature Tc represented by equations (1-1), (1-2), and (1-3)

$$Tc\ (°C.)=55+Tg\ (EW<750) \quad (1\text{-}1)$$

$$Tc\ (°C.)=0.444\times EW-278+Tg\ (750\leq EW<930) \quad (1\text{-}2)$$

$$Tc\ (°C.)=135+Tg\ (EW\geq 930) \quad (1\text{-}3)$$

where Tg designates the peak temperature of loss tangent in the dynamic viscoelasticity measurement of the ion exchange fluorocarbon resin membrane (having SO$_3$H as ends of side chains) or greater than 0.8×10$^6$ Pa, and the molecular weight of the fluorocarbon resin is 3,000 or less.

4. A membrane of a fluorocarbon-based ion exchange resin wherein the resin:
   a) comprises a copolymer substantially composed of the following repeating units (A) and (B):

(A)

(B)

where X is a F atom or a perfluoroalkyl group having 1 to 3 carbon atoms, n is an integer of 0 to 3, m is an integer of 1 to 3, Z is H, Cl, F or a perfluoroalkyl group having 1 to 3 carbon atoms and W' is $CO_2H$ or $SO_3H$;

b) has a certain equivalent weight (EW);

c) has a crystal melting heat of one J/g per gram or less when measured at a temperature of between about 270° C. and about 350° C.;

d) has acid moieties which can be substituted with tributyl ammonium ions to produce a substituted resin; and e) wherein the substituted resin has a storage modulus of at least $0.8 \times 10^6$ Pa measured according to Japanese Industrial Standard K-7244 at any of three temperatures (Tc) according to Equations 1-1, 1-2, or 1-3 as follows:

(i) when the substituted resin has an equivalent weight less than 750:

$$Tc=55+Tg \quad (1\text{-}1)$$

(ii) when the substituted resin has an equivalent weight between 750 and 930:

$$Tc=0.444 \times EW-278+Tg \quad (1\text{-}2)$$

(iii) when the substituted resin has an equivalent weight greater than 930:

$$Tc=135+Tg \quad (1\text{-}3)$$

wherein Tc is the temperature in degrees Celsius at which storage modulus is measured;

wherein Tg is the temperature in degrees Celsius of the peak of the loss tangent in the dynamic viscoelasticity measurement of the substituted resin.

5. The membrane according to any one of claims 1 to 3, wherein a ratio of the storage modulus at 150° C. to the storage modulus at 200° C. is not less than 0.4 and not more than 1.0.

6. The membrane according to any one of claims 1 to 3, wherein a ratio of the storage modulus at Tc−50° C. to the storage modulus at Tc is not less than 0.4 and not more than 1.0.

7. The membrane according to any one of claims 1 to 3, wherein said ion exchange fluorocarbon resin membrane is not cross-linked.

8. A method of manufacturing the membrane according to any one of claims 1–3 and 4, comprising the steps of
forming a film of a precursor of the ion exchange fluorocarbon resin comprising a copolymer of a fluorinated vinyl compound represented by the general formula $$CF_2=CF-(OCF_2CFL)_n-O-(CF_2)_m-W$$

and a fluorinated olefin represented by the general formula $$CF_2=CFZ$$

where L is a F atom or a perfluoroalkyl group having 1 to 3 carbon atoms, n is an integer of 0 to 3, m is an integer of 1 to 3, Z is H, Cl, F or a perfluoroalkyl group having 1 to 3 carbon atoms and W is a functional group convertible to $CO_2H$ or $SO_3H$ by hydrolysis, and then hydrolyzing the same, wherein said precursor of the ion exchange fluorocarbon resin has a heat of crystal fusion at 270 to 350° C. of 1 J/g or less, and a melt index of not less than $7 \times 10^{-6}$ and not more than 1.

9. The method according to claim 8, wherein said precursor of the ion exchange fluorocarbon resin has a melt index (JIS K-7210) of not less than $7 \times 10^{-6}$ and not more than 0.5.

10. The method according to claim 8, wherein said precursor of the ion exchange fluorocarbon resin has a melt index (JIS K-7210) of not less than $7 \times 10^{-6}$ and not more than 0.4.

11. The method according to claim 8, wherein said precursor of the ion exchange fluorocarbon resin has a melt index (JIS K-7210) of not less than $7 \times 10^{-6}$ and not more than 0.1.

12. The method according to claim 8, wherein stretching is performed in at least one direction after film formation.

13. The method according to claim 12, wherein stretching is performed prior to hydrolysis, and the hydrolysis is performed while maintaining orientation.

14. The method according to claim 12, wherein the temperature for said stretching is 70° C. or above and below 300° C.

15. A membrane electrode assembly comprising an ion exchange fluorocarbon resin membrane according to any one of claims 1 to 3 and 4.

16. A solid polyelectrolyte type fuel cell comprising an ion exchange fluorocarbon resin membrane according to any one of claims 1 to 3 and 4.

17. The membrane according to any one of claims 1 to 3 and 4, wherein the copolymer is formed by random copolymerization.

* * * * *